Oct. 30, 1928.

F. J. TROLL 1,689,644

LOAD MEASURING DEVICE

Filed May 8, 1922     2 Sheets-Sheet 1

Oct. 30, 1928.  
F. J. TROLL  
LOAD MEASURING DEVICE  
Filed May 8, 1922  
1,689,644  
2 Sheets-Sheet 2
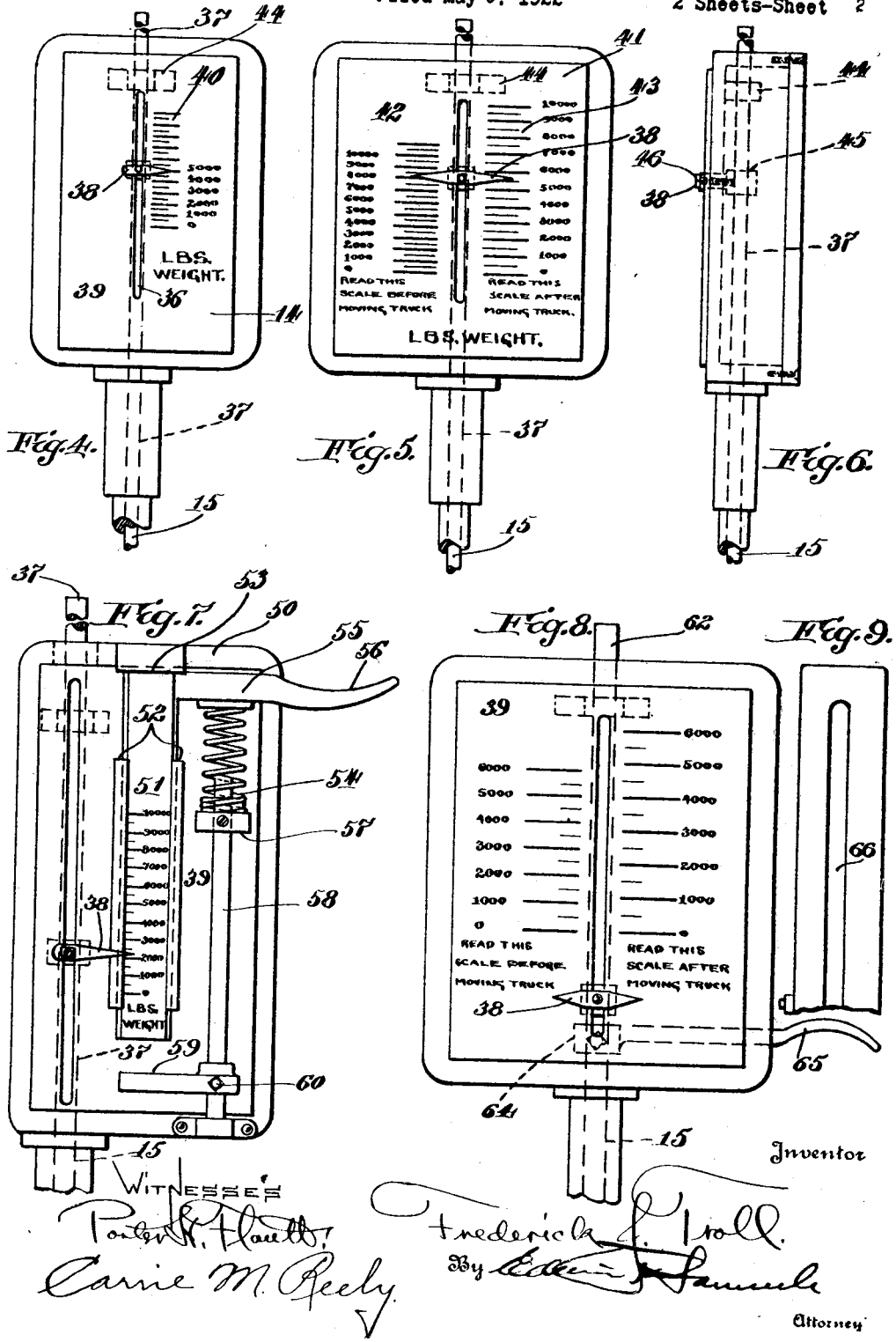

Patented Oct. 30, 1928.

1,689,644

UNITED STATES PATENT OFFICE.

FREDERICK J. TROLL, OF BALTIMORE, MARYLAND, ASSIGNOR TO THE LOADOMETER COMPANY, A CORPORATION OF DELAWARE.

LOAD-MEASURING DEVICE.

Application filed May 8, 1922. Serial No. 559,151.

In view of the legal restrictions as to maximum total load carried by vehicles and maximum load per inch of tire width which are going into effect in the various States on account of the damage which has been done to the road by overloaded vehicles, the necessity for load indicating apparatus on the majority of heavy trucks has been recognized by the majority of manufacturers but the apparatus of this nature has proved objectionable to the manufacturers and users of these trucks on account of its complication, its cumbersome nature and its lack of reliability and tendency to get out of order, also the expense of such apparatus of the otherwise most acceptable type, has been so considerable as to deter truck manufacturers from adopting it. The present invention relates to a load indicator for trucks by which these various difficulties are overcome; the apparatus being of extremely cheap, simple and light construction.

Theoretically the vehicle springs are flexed to a degree which is proportionate to the load, and the invention relates to a device whereby the load is determined by measuring or indicating the distance or variations of the distance from the body to the axle or wheel centers or a quantity which is proportionate thereto.

A difficulty which is incident to measuring a load in this way is due to the fact that the frictional resistance of the springs, i. e., the friction between the spring leaves, in part overcomes the tendency of the load to flex the springs, and the maximum flexing of the springs due to the load does not take place until the truck has been driven far enough to overcome this frictional resistance, this being brought about by the vibration and jarring which takes place while the truck is in motion; resulting in a spring settlement.

This spring settlement is a source of inconvenience in use because it is frequently found that after the truck has been driven the load which appeared to be perfectly legitimate is in fact excessive and must be reduced. To overcome this difficulty in the present instance, means have been provided in connection with the indicator whereby a corrected reading is obtained before the truck has been moved, which is equal or substantially equal to the reading which will be obtained after the truck has been driven and the frictional resistance of the springs has thereby been overcome. I have found that on most trucks of small capacity practically no spring settlement takes place. In such a truck it is therefore not at present considered necessary to provide means for compensating for the spring settlement on small trucks.

Another objection to the previous instruments of the type which is actuated by the flexing of the springs to indicate the load, has been due to the fact that they are subject to the vibration of the road so that they are continually in operation throughout the trip, the entire apparatus being subject to many thousand times the wear which takes place in actual use, i. e., in indicating the load when readings are desired. To overcome this difficulty I have devised means whereby the apparatus is held normally out of operation being placed in operative position at the will of the operator and only when a reading is desired, being thrown out of operation automatically after the reading has been obtained.

In the accompanying drawing I have illustrated load indicating apparatus embodying my invention.

In the drawing:

Figure 4 is an elevation of an indicating instrument of the simpler form having no correcting feature, particularly adapted to be used on a small truck where no spring settlement takes place;

Figure 5 is a front elevation of an instrument having two scales, one embodying the aforesaid correction;

Figure 6 is a side elevation showing both of the latter instruments;

Figure 7 is a front elevation of an instrument having still another correcting means;

Figure 8 is a front elevation showing still another instrument having also included in Figures 2 and 3 an improved indicating device whereby the instrument is held insensitive while not in use and then relieved of the road vibration;

Figure 9 is a side elevation of the same.

Figure 1:
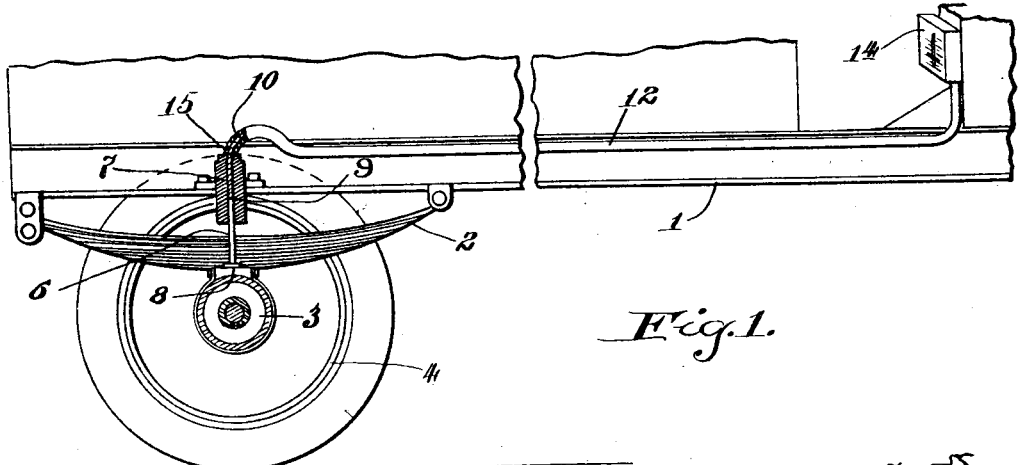
Figure 1 is a side elevation partly in section showing the rear axle, a portion of the frame and the dash of a truck to which my indicator is applied.
Figure 2:
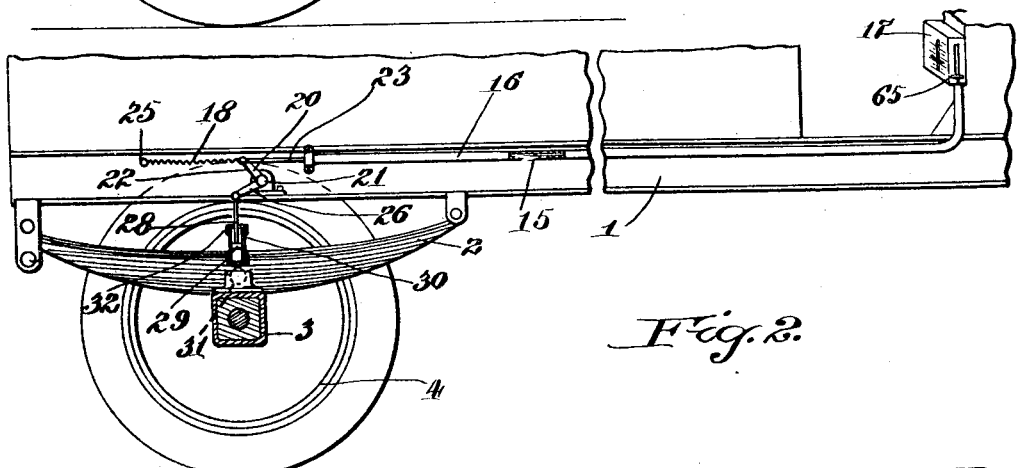
Figure 2 is a similar view showing a modified form of the apparatus.
Figure 3:
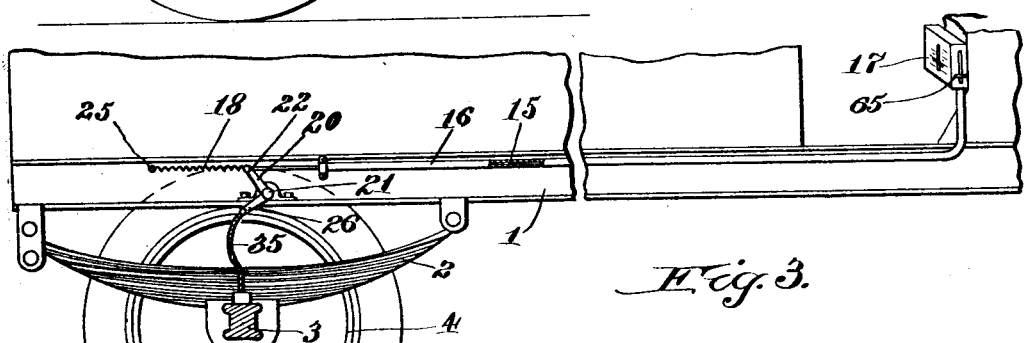
Figure 3 is a similar view showing still another form.

Referring to the drawings by numerals, particularly Figures 1, 2 and 3, the illustration includes a truck under frame 1, vehicle springs 2; axle 3 which is preferably the rear axle, and wheels 4; the load indicating apparatus referring particularly to Figure 1 consists of a thrust rod 6 which slides in a vertical guide 7, the rod being secured at its lower end to the rear axle 8. The sliding end 9 of the thrust rod is connected to a flexible shaft or thrust member 10 which may be of the type known commercially as the Bowden wire. This consists of a tubular member 12, connected at one end to the slide guide 7 and at the opposite end to the indicator box 14. Inside the tube is a wire cable 15 which fits the tube with a sufficient degree of snugness to prevent kinking, the wire or cable being of sufficiently hard metal so that the tendency to kink is reduced to the minimum without sacrificing the flexibility which is requisite to free passage of the wire through the tube, permitting it to conform to the bends, it being perfectly feasible to bend the tube and wire to conform to the conditions presented; permitting it to follow the frame of the truck and be conveniently placed as in the corner of one of the longitudinal channels as shown. The bends are preferably smooth and of a sufficient radius, but it is feasible to connect the apparatus to the rear axle utilizing the vertical thrust of the axle relative to the frame and to turn the shaft to a horizontal direction so that it will run along the frame and to turn it upward vertically from the horizontal to the indicator box on the dash.

In Figures 2 and 3 I have shown an apparatus which is normally out of operation so that it is quiescent, avoiding wear and vibration while the truck is in motion. This apparatus as shown includes a flexible shaft or thrust member 15, 16 mounted on the frame connected at one end to an indicator box 17 on the dash and at the other end to the rear axle 3. The connections provide sufficient play so that by means of a spring 18 which takes up the play in a direction opposite to the indicating thrust, the working parts are held out of operation except when the flexible shaft is drawn forward into operative position, taking up the play in the opposite direction against the tension of the spring. As soon as the tension on the shaft is released the spring withdraws the shaft, placing the parts in inoperative position. A similar device, the parts recited being indicated by similar reference characters, is shown in Figure 3, the connections between the flexible shaft and the rear axle being different.

Referring to the details of the aforesaid connection as disclosed in Figure 2, I have shown a bell crank lever 20, pivoted on the frame at 21, having an upright arm 22 connected to the thrust rod 23 which forms an end or extension of flexible shaft 15, the same corresponding to the thrust rod 9 and flexible shaft 10 in pipe 12. The said upright arm 20 is also connected by the tension spring 18 to a stationary point 25 on the frame, the spring leading in a direction from arm 20 opposite to that of shaft 15. The spring tends to draw the shaft rearwardly away from the indicator box. The other or substantially horizontal arm of the bell crank lever 26 is pivotally connected at its swinging end with a depending connecting rod 28 which carries at its opposite end a piston or stop member 29, which slides in a dash pot or cylinder 30 extending upwardly from the axle on which it is mounted by means of a ball and socket joint 31. The cylinder or dash pot 30 has a suitable cap 32 which prevents the escape of the piston or stop member 29. The object of this structure is to provide sufficient play between the indicator instrument proper 17 and the rear axle so that the apparatus will not be normally or continually in operation when no reading is desired. The piston or stop 29, as will be understood, slides freely up and down in the cylinder or dash pot, or whatever guide 30 may be used, the exact form of the guide being immaterial. The spring 18 draws the flexible shaft backwards, tending to depress the piston towards the bottom of the cylinder or guide. Whenever a reading is desired the shaft 15 or flexible member inside the shaft which is connected to the indicator is drawn forward giving a maximum reading as hereinafter described. The shaft is then released and withdrawn in response to the tension of the spring 18.

In Figure 3 I have shown as part of the connecting means, a bell crank lever 20 pivoted at 21, having an upright arm 22 connected to the shaft 15 and oppositely to the spring 18. I have also shown a substantially horizontal arm 26, but instead of the telescoping connection comprising sliding guide or piston and piston rod or dash pot 29, 30, I have provided play by means of a flexible connection or cable 35, the same being fastened at one end to the swinging end of the arm 26 and at the other end to the rear axle 3.

In Figure 4 I have shown an indicating instrument of the type which is particularly adapted for use on trucks of small capacity where no compensating means need be provided for spring settlement, the reading on the one dial being approximately the same both before and after the truck has been driven, this is part of the apparatus shown in Figure 1, the flexible wire cable 15 terminating in an indicator rod 37 sliding in suitable guides and carrying a hand or pointer 38 which extends through slot 36 and moves over a dial 39 having suitable graduations 40 in pounds or tons. The indicating instrument 41 shown in Figure 5 is similar to the one shown in Figure 4 except that it has a corrected scale 42 to be read before moving the truck; and a scale 43 to be read after moving the truck. The scale 42 is referred to herein as having the requisite corrections to provide for spring friction or settlement.

In Figure 6 I have shown the top guide 44 for the rod 37, and I have also shown a carrier 45 for the indicator hand 38 the same being mounted to slide along the rod and held in an adjusted position by a set screw 46 which also holds the hand.

In Figure 7 I have shown an indicating instrument 50 which is in effect like the instrument 14 shown in Figure 4 except that it embodies still another system of correction. In this instrument in addition to the sliding rod 37 and indicator hand 38 moving on the dial 39 I have shown a scale 51 which is mounted to slide in suitable guide ways 52 parallel to the motion of the indicator; the scale 51 being held against a stop 53 by means of a spring 54 which bears at one end against a suitable abutment 55 on the scale which is extended in the form of a handle 56 and at the other end against a stop 57 on a rod 58 which is also parallel to the motion of the indicating hand and which carries at its lower end a stop 59 for the scale. The spring 54 tends to normally hold the scale in its upper position which may be termed the corrected position for measuring the load before the truck has been driven. When the truck has been driven and the spring friction has been overcome and the spring settlement has taken place, the load may be measured by pressing down on the handle 56 which moves the scale down into position against the stop 59 which position is suitable for measuring the load by the greater flexing of the springs due to the spring settlement. The stop 59 is made adjustable up and down the shaft 58, the stop being held in proper position by set screw 60.

In Figures 8 and 9 I have shown an indicating instrument intended to be used with the apparatus shown in Figures 2 and 3. The same consists of a dial 39 having an indicator pointer 38, but this indicator or pointer is carried on a sliding rod 62 which moves up and down in suitable bearings being connected with the flexible shaft 15. The rod 62 corresponds to the rod 37 in Figure 4, the same being actuated by the flexible Bowden wire thrust shaft or other suitable connections 15 and 16 aforesaid. Secured to this member 15 is a collar 64 provided with a handle or hook 65 which projects outside the casing through a slot 66. Normally the connecting member 15 is withdrawn by the spring 18 so that the members 28, 29, 30 or 35, referring to both Figures 2 and 3, do not transmit any motion, being thereby rendered inoperative, on account of the back lash or play which is thus made effective, the pointer remaining at or below zero. To obtain a reading the handle or hook 65 is drawn upward by hand overcoming completely the tension of the spring 18, which is very weak taking up the back-lash or play and placing the parts in operative position, giving a reading as if the connection from the rear axle to the indicating box were rigid. In this way the desired maximum reading may be easily attained. As soon as the maximum reading is noted the hook is released and the spring 18 withdraws the shaft, again making the back lash effective so the parts are stationary.

I have thus described specifically and in detail a single machine embodying my invention in order that the nature and operation of the device may be clearly understood, however, the specific terms herein are used descriptively rather than in a limiting sense, the scope of the invention being defined in the claims.

What I claim and desire to secure by Letters Patent is:

1. In a road vehicle having a body and wheels, springs for supporting the vehicle body on the wheels, a flexible thrust rod and means for communicating to the thrust rod the variation in relative position between the vehicle body and the wheels due to flexing of the springs, and an indicating instrument reading in terms of the load connected to said thrust rod to be actuated thereby.

2. In combination with a road vehicle having wheels and a body supporting frame, an axle and springs supporting the frame on the axle; a weight indicating instrument and means connecting said instrument to the axle comprising a flexible thrust member for communicating the relative motion between the wheel and the body supporting frame to said indicating instrument, said connecting means providing a considerable degree of play permitting said connection to become inoperative to transmit said motion to the instrument, means tending to withdraw said connection from operative position so that said relative motion of the body frame and wheels communicate no motion to the thrust member and means whereby said connection may be moved against the tendency of said withdrawing means at the will of the operator making said connections operative whereby the said instrument is caused to indicate the load.

3. In combination with a road vehicle having wheels, an axle and a body supporting frame and springs supporting the frame on the axle, a weight indicating instrument and means connecting said instrument to the axle comprising a flexible thrust rod and means for communicating the relative motion between the wheel and the body supporting frame to said thrust rod providing a considerable degree of play permitting said connection to move to inoperative position and means tending to withdraw said connecting means from operative position so that said relative motion of the body frame and wheels normally communicates no motion to the thrust member and means under the control of the operator for taking up said back lash in the opposite direction against said tendency, making said connections operative whereby the said instrument is caused to indicate the load; said connection comprising a bell crank lever, one arm of which is connected to the thrust rod and collapsible means connecting the other arm to the wheel axle.

4. In a load indicator for a road vehicle, having a body and wheels, an indicating instrument; means for communicating the variation in relative position between the wheels and the vehicle body to said instrument, said instrument having graduations which read in terms of the entire load before the truck is moved from the position of loading and also means providing a corrected scale to read in terms of the load after the truck has been moved to compensate for the spring settlement.

5. In a road vehicle having wheels, a body supporting frame and springs supporting the frame on the wheels, an indicating instrument and means for communicating to said instrument the variation in position between said frame and said wheels; the instrument having graduations and indicating means reading in terms of the load before and after spring settlement which settlement takes place between the time when the vehicle is standing in the position in which it was loaded and after the vehicle has been run carrying the load.

6. In a load indicator for a wheeled road vehicle, an indicating instrument, means for communicating the variation in relative position between the vehicle body and the wheels to said instrument and means reading in terms of the load before and after spring settlement.

7. In combination with a road vehicle having wheels and a body, springs supporting the frame on the wheels an indicating instrument, means including a flexible connection to said indicating instrument whereby the variation of position between the body and the wheels is communicated to said instrument, said connection providing a considerable degree of play, means for taking up said play in one direction throwing the instrument out of operation and means operable at the will of the operator for taking up the play in the opposite direction, causing the instrument to indicate.

Signed by me at Baltimore, Maryland, this 4th day of April, 1922.

FREDERICK J. TROLL.